United States Patent [19]

Fuchs

[11] Patent Number: 5,029,807
[45] Date of Patent: Jul. 9, 1991

[54] SOLENOID VALVE

[75] Inventor: Franz Fuchs, Ottobrunn, Fed. Rep. of Germany

[73] Assignee: Messerschmitt-Boelkow-Blohm GmbH, Munich, Fed. Rep. of Germany

[21] Appl. No.: 516,150

[22] Filed: Apr. 30, 1990

Related U.S. Application Data

[63] Continuation-in-part of Ser. No. 343,171, Apr. 25, 1989, abandoned.

Foreign Application Priority Data

[30] Apr. 30, 1988 [DE] Fed. Rep. of Germany ....... 3814765

[51] Int. Cl.$^5$ .............................................. F16K 31/08
[52] U.S. Cl. .................. 251/65; 251/129.19; 251/129.18
[58] Field of Search .............................. 251/65, 129.19

[56] References Cited

U.S. PATENT DOCUMENTS

| | | | |
|---|---|---|---|
| 4,056,255 | 11/1977 | Lace | 251/65 X |
| 4,299,252 | 11/1981 | Reinicke | 251/65 X |
| 4,392,634 | 7/1983 | Kita | 251/129.19 |
| 4,605,197 | 8/1986 | Casey et al. | 251/65 X |

Primary Examiner—Arnold Rosenthal
Attorney, Agent, or Firm—W. G. Fasse

[57] ABSTRACT

A valve for sealing a conduit under pressure has an armature (12) cooperating with two springs, a permanent magnet, and a solenoid coil. The force of the permanent magnet is used to cock a spring and thereby stored primarily as a spring force when the valve is in any of its two end positions. THe spring force is slightly smaller than the permanent magnetic force of the permanent magnet, and this slightly smaller spring force is effective on a valve stem through a sleeve in a direction opposite to that of the permanent magnetic force. The permanent magnetic force is, for example, stored in a Belleville spring and additionally in a helical or conical spring which provides an extra valve biasing force. In order to open the valve, the solenoid coil (9) of an electromagnet is energized to counteract the force of the permanent magnet to an extent slightly below the stored spring force. Thus, this valve is capable of having a monostable or a bistable characteristic, depending on the adjustment of the spring force with the aid of an adjustment ring engaging a threading on the valve stem.

5 Claims, 5 Drawing Sheets

SOLENOID VALVE

CROSS-REFERENCE TO RELATED APPLICATION

This application is a Continuation-In-Part application of my copending application U.S. Ser. No. 07/343,171, filed on Apr. 25, 1989, now abandoned.

FIELD OF THE INVENTION

The invention relates to a magnetically operated solenoid valve for closing pressurized conduits. Such valves have a permanent magnet and a solenoid or electromagnet. The force of the permanent magnet causes an armature to press a valve plug or stem into one or the other of its two end positions. The electromagnet operates the valve either for closing or opening the valve.

BACKGROUND INFORMATION

In conventional solenoid valves, the magnetic force of the permanent magnet is transferred through pole pieces onto an armature. The magnetic coil of the solenoid is arranged radially relative to the axis of the magnet because the flux of the permanent magnet also extends radially relative to the operating axis of the valve plug and through the armature. This type of construction requires relatively large dimensions for several reasons.

First, only a fraction of the available circular cross-section of the armature is efficiently utilized for the magnetic flux.

Second, the solenoid coil is not optimally utilized due to the open magnetic circular which causes stray fields. The force of the permanent magnet is effective always in the closing direction in all positions of the valve plug. Stated differently, conventional structures of this type are monostable. If conventional structures are to be modified to become bistable, additional effort and expense must be made to achieve a bistable characteristic in which the valve plug or valve stem remains stable in each of its two end positions.

U.S. Pat. No. 4,299,252 (Reinicke) discloses an electromagnetically operated actuator boosted by a permanent magnet. The actuator operates a valve poppet 80 which is normally closed, so that the known valve is monostable. Reinicke's valve operating mechanism has an upper pole and a lower pole with such an arrangement of the armature, electromagnet, and permanent magnet that the valve is always returned into the lower valve closing position. For this purpose, the armature 22 is held in the valve closing position by the permanent magnet 48 and by the force of the Belleville springs 24, 26 which are effective only in the closing direction. To open Reinicke's valve the solenoid coil 36 is energized, whereby the magnetic flux through the upper pole is increased by the combination of the flux of the permanent magnet and of the electromagnet. Thus, the valve closing force of the lower pole and of the springs is overcome to open the valve. When the coil 36 is switched off again, the forces of the permanent magnet and of the Belleville springs again close the lower pole. Such known arrangement does not suggest a structure that is selectively either monostable or bistable.

U.S. Pat. No. 4,392,634 (Kita) discloses an electromagnetic valve that employs two springs 64 and 74. One spring 64 biases the valve stem 8 downwardly at all times. The other spring 74 merely fixes the solenoid coil 7 in position to reduce so-called valve chattering. Suggestions for constructing a valve so that it can be selectively operated in a bistable mode or in a monostable mode are not made by Kita's disclosure.

OBJECTS OF THE INVENTION

In view of the foregoing it is the aim of the invention to achieve the following objects singly or in combination:

to construct a magnetic or solenoid valve in such a way that effectively utilized cross-sections of the armature and the electromagnets are provided, thereby reducing the overall dimensions of such valves;

to construct such a valve in such a manner that the electromagnetic force needed for opening the valve is relatively small;

to construct a valve of this type so that it is capable to function as a monostable valve or as a bistable valve without expensive structural modifications by mere minor adjustments in the position of valve components relative to each other for assuring one or the other operation; and to improve the response characteristic of such valves so that operating times are short and so that switching impact forces of the armature are reduced.

SUMMARY OF THE INVENTION

A solenoid valve according to the invention comprises the following features, namely a valve housing including a housing cover, a permanent magnet having a permanent magnetic force in said valve housing, an electromagnet generating an electromagnetic force for operating said valve, said electromagnet including a solenoid coil and an armature in said housing, said permanent magnetic force normally pressing said armature against said housing when said valve is closed, and spring means arranged for cooperation with said solenoid coil when said solenoid coil is energized, said permanent magnet being arranged in a recess in a lower portion of said solenoid coil facing said armature, a housing extension reaching radially inwardly, said solenoid coil and said permanent magnet each having a downwardly facing side having direct contact with said housing extension, a magnetizable soft iron ring arranged between said solenoid coil and said permanent magnet, so that, when said valve is closed, a magnetic circuit of said permanent magnet establishes itself between a north pole and a south pole of said permanent magnet through said soft iron ring and through said housing extension substantially without an air gap, sleeve means for closing and opening said valve operable by said permanent magnet through said armature, said spring means comprising a first spring having a first spring force and a second spring having a second spring force, said first and second springs being arranged for cooperation with said sleeve means, so that when said valve is closed said permanent magnetic force of said permanent magnet urges said first and second springs in a valve closing direction, whereby a larger proportion of said permanent magnetic force is effective on said first spring than on said second spring, wherein during opening of said valve said electromagnetic force initially overcomes said second spring force through a gap 29 formed between said armature and an adjustment ring, whereupon said electromagnetic force reduces the effect of said permanent magnetic force down to zero, whereby energy stored in said first spring becomes free for fully opening said valve, and wherein an air gap G is formed between a downwardly facing surface of said armature and said housing extension when said valve is fully opened, so that said permanent magnetic force which is effective on said armature through an outer magnetic circuit in a valve opening direction, is also effective for biasing said first spring to store energy in said first spring when said valve is fully opened.

An important feature of the invention is the arrangement of the permanent magnet relative to the solenoid coil of the electromagnet and also the arrangement of the permanent magnet and the solenoid coil relative to the housing and to the armature, so that the permanent magnetic force of the permanent magnet is fully effective on the armature and thus for cocking the first spring to thereby store the force of the permanent magnet, so to speak, in the form of the biasing force of the first spring. These features are achieved by the arrangement of the permanent magnet in a recess of the solenoid coil in combination with the other features described above. The claimed arrangement makes it possible that for opening the valve the full electromagnetic force of the solenoid coil is instantaneously available for counteracting the permanent magnetic force, thereby assuring a positive valve action.

Another important advantage of the invention resides in the arrangement of the springs which are effective on the valve stem. A substantial proportion or most of the magnetic force of the permanent magnet is stored in these springs on which the force of the permanent magnet is effective through the armature. Still another advantage is achieved by the easy selection of a monostable or bistable characteristic, whereby for the bistable characteristic of the present valve the predominant proportion of the magnetic flux in the open valve position extends concentrically through the armature and through the armature end surface facing an air gap of zero width. By adjusting the spring force with a simple adjustment screw, to a force below that of the permanent magnet, a bistable characteristic is achieved. On the other hand, when the spring force is adjusted to be larger than the force of the permanent magnet a monostable characteristic is achieved.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
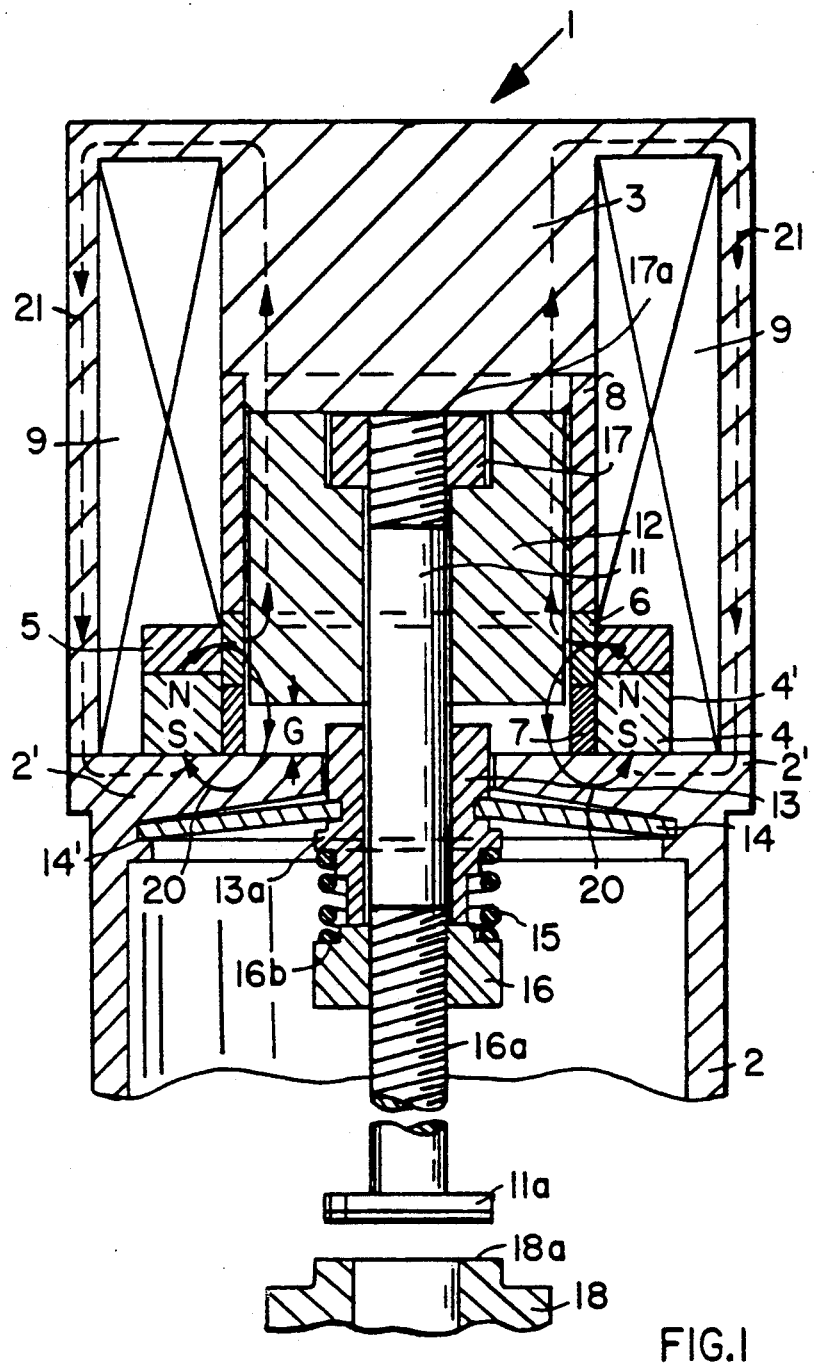
FIG. 1 is a sectional view through one embodiment of a solenoid valve according to the invention shown in its valve open condition and having a one Belleville spring arranged in series with a helical spring.

FIG. 1 shows a solenoid magnetic valve 1 of the invention in a valve open state. A housing 2 has a housing cover 3. The following components are rigidly installed in the valve housing. An axially magnetized permanent ring magnet 4 rests on a bottom ring flange 2' of the housing 2. The ring magnet 4 is received in a recess 4' of a solenoid coil 9. A ferromagnetic ring disk 5, e.g. of soft iron, rests on the permanent magnet 4. A ferromagnetic ring 6 is held in place inside the ring disk 5 between a magnetically nonconducting guide bushing 7 and a magnetically nonconducting guide bushing 8. The solenoid coil 9 is arranged in the cover 3 to surround the just mentioned components which are held in a stationary position in the housing, or rather in the housing cover 3. The other components in the housing 2 and cover 3 are movable and they are illustrated in the above mentioned valve closed and valve opened positions. The movable components comprise a valve stem 11 with a poppet 11a, cooperating with a valve seat 18a, an armature 12, and a guide sleeve 13. The movable components further include a Belleville or cup spring 14, a helical spring 15, a lower adjustment ring or member 16 cooperating with a threading 16a on the valve stem 11, and an upper adjustment ring or member 17 cooperating with a threading 17a on the upper end of the valve stem 11. In the valve closed condition shown in FIG. 2, when the poppet 11a rests against the valve seat 18a of conduit 18, the latter is closed. The valve is opened with the poppet 11a raised as shown in FIG. 1. In the valve closed condition of FIG. 2, an air gap 30 is present between a shoulder 16b of the adjustment member 16 and an axially downwardly facing end surface of the guide sleeve 13. The cover 3 is, e.g., screwed to the flange 2' of the cylindrical housing section 2. The flange 2' which has a bore for the sleeve 13 to pass through the base. Referring specifically to the valve closed illustration of FIG. 2, the magnetic field lines 20 of the permanent magnet 4 pass from the north pole N through the ring disk 5, the ring 6, the armature 12, and through the housing ring flange 2' to the south pole S of the permanent magnet 4. Practically, the entire permanent magnetic force is effective on the armature 12 through the air gap of zero width between the armature 12 and the housing ring flange 2'. A major proportion of the permanent magnetic force of the permanent magnet 4 is effective for biasing the Belleville or cup spring 14, whereby this permanent magnetic force is stored as a biasing force in the Belleville or cup spring 14 through the sleeve 13. The radially inner rim of the Belleville or cup spring 14 rests in a groove of the guide sleeve 13. The radially outer rim of the Belleville spring 14 rests in a groove 14' of the housing section 2. The remaining proportion of the permanent magnetic force holds the armature 12 against the ring flange 2'. A helical spring 15 inserted between a shoulder 13a of the sleeve 13 and a shoulder 16b of the adjustment ring 16 applies a defined additional force to the valve stem 11, for example, to assure a well defined valve closing force which presses the valve poppet 11a against the valve seat 18a to provide a respective sealing force.

Figure 2:
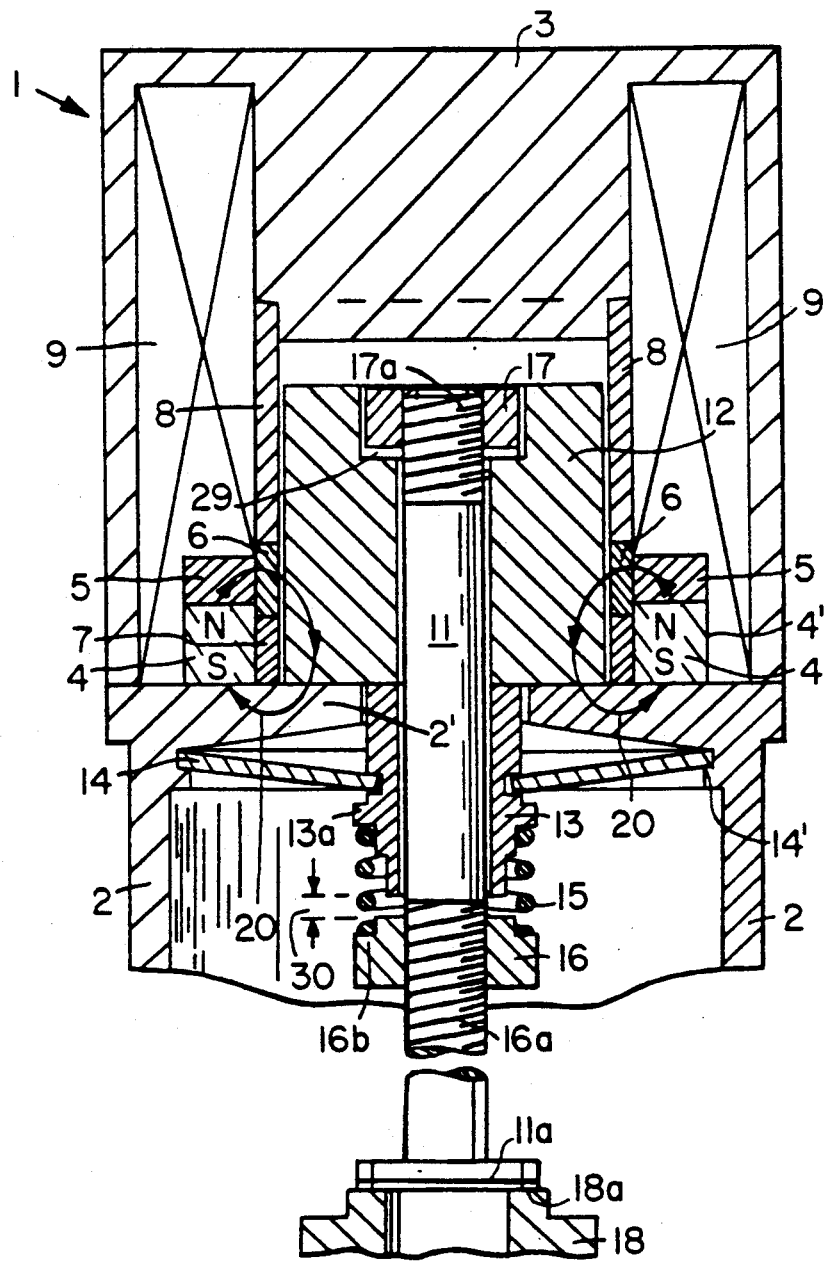
FIG. 2 shows the valve of FIG. 1 in the valve closed position.

In the closed condition of the valve, as shown in FIG. 2, there is an spring 15 in the closed condition air gap 29 between the adjustment ring 17 and the armature 12, whereby the valve seat 18a in the conduit 18 is subject only to the force of the spring 15.

In order to open the solenoid valve 1 by lifting the poppet 11a off the seat 18a, as shown in FIG. 1, the solenoid coil 9 is energized so that an electromagnetic flux 21 is generated as shown by the dashed flux line 21 in FIG. 1. The electromagnetic flux 21 of the coil 9 passes through the housing cover 3 through the armature 12 and through the housing ring flange 2'. The direction of the flux 21 opposes the permanent magnetic force 20 shown in FIG. 2 of the permanent magnet 4 in the armature 12. As a result, the permanent magnetic force 20 in the air gap between the housing ring flange 2' and the armature 12 is reduced to zero and the force stored in the spring 14 which is effective in a direction opposite to that of the permanent magnetic, force, is now fully available as a valve opening force of the spring 14. This spring force acts through the sleeve 13, the armature 12, and the adjustment ring 17 on the upper threading 17a of the valve stem 11, so that the poppet 11a is lifted off the valve seat 18a as shown in FIG. 1. Additionally, the electromagnetic force caused by the flux 21 in the coil 9 acts also as a valve opening force.

The magnetically nonconducting sleeves 7 and 8 prevent the formation of a secondary magnetic flux by the coil 9 and by the permanent magnet 4. For removing the magnetic force in the armature gap of zero width and thus for making the force stored in the Belleville spring 14 effective, a small induction in the coil 9 is sufficient to lift the armature 12 into the position of FIG. 1, whereby a gap G is formed between the ring flange 2' and the bottom of the armature 12.

Figure 5:
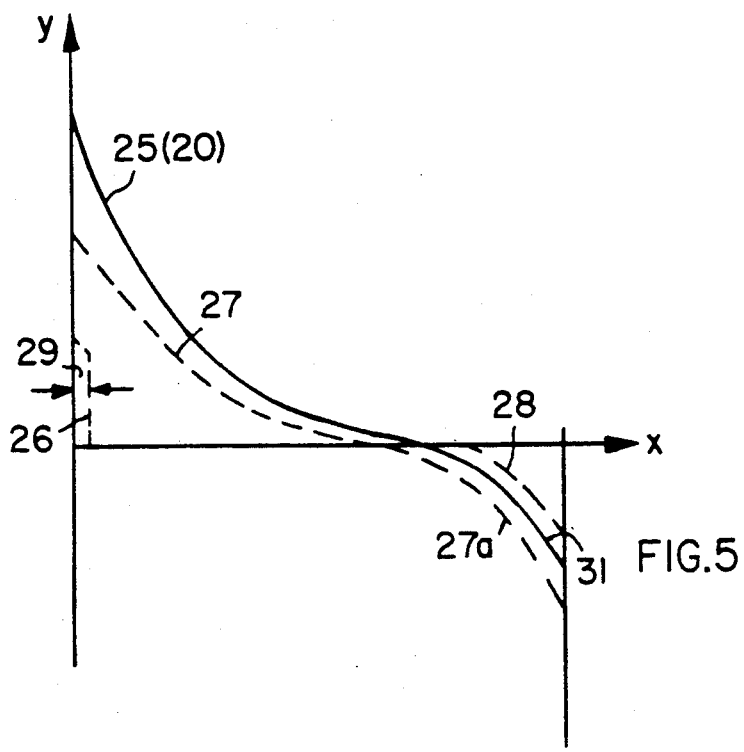
FIG. 5 shows the forces effective on the valve stem as a function of the work stroke of the valve according to FIGS. 1 and 2.

FIG. 5 illustrates the characteristic curves of the forces effective on the valve stem 11 of the valve embodiment shown in FIGS. 1 and 2, as a function of the armature air gap or armature stroke G. Thus, the ordinate in FIG. 5 represents the forces effective on the valve stem 11 and the abscissa illustrates the armature stroke. The curve 25(20) above the abscissa X and the extension 31 of the curve 25(20) below the abscissa X represent the magnetic force 20 of the permanent magnet 4. Stated differently, without the effect of the electromagnetic force 21 of the solenoid coil 9, the permanent magnetic force 25(20) decreases in the closing direction of the valve while increasing in the opening direction when the armature stroke G increases. When the solenoid coil 9 is energized, its electromagnetic force 21 decreases the permanent magnetic force 25(20) to zero and simultaneously it amplifies the permanent magnetic force component 31 which is effective on the armature 12 to urge it in an opening direction. The permanent magnetic force 25(20) is effective on the armature 12 to urge it in a closing direction. The dashed curves represent the spring forces. The small curve portion 26 represents the additional force stored in the helical spring 15. The dashed curve portions 27 and 27a represent the spring force of the Belleville or cup spring 14 when it acts in a monostable manner. The curve 27 and the curve 28 represent the force of the Belleville spring 14 when it acts in a bistable manner.

The magnetic force 20 of the permanent magnet 4 which presses the valve stem 11 against the valve seat 18a in the closed state of the valve when the stem displacement equals zero. This permanent magnet force 20 must be somewhat larger than the sum of the spring forces 26 and 27. By energizing the solenoid coil 9 for opening the valve as shown in FIG. 1, the force 25 corresponding to the magnetic force 20 of the permanent magnet 4 is reduced until it is equal to the sum of the spring forces 26 and 27. After this reduction of the permanent magnetic force 20, the armature 12 moves upwardly, whereby the armature stroke G shown in FIG. 1 passes through the width of the gap 29 in the direction of the x-axis. The distance 29 forms an air gap between the adjustment ring 17 and the armature 12. The air gap 29 thereby becomes zero and the effect of the value closing spring biasing force 26 of the helical spring 15 is eliminated. Thereafter, the spring force 27 alone causes the complete opening of the valve seat until, due to the further formation of the field of the solenoid coil 9, the magnetic force 25 is reduced to zero. During this process the Belleville spring 14 which provides the spring force 27, relaxes to zero so that the armature 12 moves upwardly due to the electromagnetic force of the solenoid coil 9 which is now increasingly effective on the armature 12, thereby cocking the Belleville spring 14 in the opposite effective direction through the adjustment ring 17, the valve stem 11, the adjustment ring 16, the helical spring 15, and the bushing 13. As a result, the helical spring 15 is also further biased and the air gap 30 between the shoulder 16a of the adjustment ring 16 and the shoulder 13a of the sleeve 13 is reduced to zero in the valve open state shown in FIG. 1. Hence, gaps 29, 30 are not shown in the open state of FIG. 1, but a gap now exists between armature 12 and sleeve 13 because the once adjusted surface to surface axial spacing between adjustment rings 16 and 17 and the axial lengths of the armature 12 and of the sleeve 13 do not change. As the electromagnetic force 21 of the solenoid coil 9 further increases after the magnetic force 25 has been completely overcome in the closing direction, the Belleville spring 14 is also cocked again through the armature 12 in the opening direction by the electromagnetic force of the coil 9 and the permanent magnetic force 31 effective on the armature 12.

The size of the gap 30 is important for the point of time, subsequent to the closing of the gap 30, at which the upwardly directed motion of the valve stem 11 becomes effective on the motion of the Belleville spring 14 which now is also upwardly directed. If the gap 30 is zero or very small, the Belleville spring 14 is immediately cocked in the opposite direction after it passed through zero in accordance with the curve 27a. As a result, the force 27 of the Belleville spring 14 becomes larger than the force 31 of the permanent magnet 4 so that the valve arrangement is now monostable.

On the other hand, if the gap 30 is large, the Belleville spring 14 is cocked after a time period, namely subsequent to the closing of the gap 30, whereby its force characteristic 28 remains below the force characteristic 31 of the permanent magnet 4, whereby the arrangement is bistable. Thus, in the fully open position of FIG. 1 of the valve stem 11 the force of the Belleville spring 14 is larger than the magnetic force 31 effective on the armature 12. The spring force will correspond to the curve 27a, whereby the armature 12 with the valve stem 11 returns into the starting position when the energizing current for the solenoid coil 9 has been switched off. Now, the arrangement is monostable again. However, if the force of the Belleville spring 14 corresponds to the spring force characteristic 28, the armature 12 remains in its assumed upper end position according to FIG. 1 showing the open state of the valve in which case the valve is bistable.

Thus, it is apparent that the valve structure according to the invention can achieve a monostable or a bistable characteristic by a simple adjustment, namely rotating the adjustment ring 16 on the threading 16a. The adjustment of the axial play between the armature 12 and the valve stem 11 is accomplished by a simple adjustment of the adjustment ring 17 on the threading 17a.

When the valve shall have a bistable characteristic due to the adjustment of the spring force of the spring 14, the armature 12 and the valve stem 11 are caused to move into the starting position by reversing the current flow direction in the solenoid coil 9 or by providing a second coil having an opposite polarization so that the energizing current can be switched from one coil to the other and vice versa.

Figure 3:
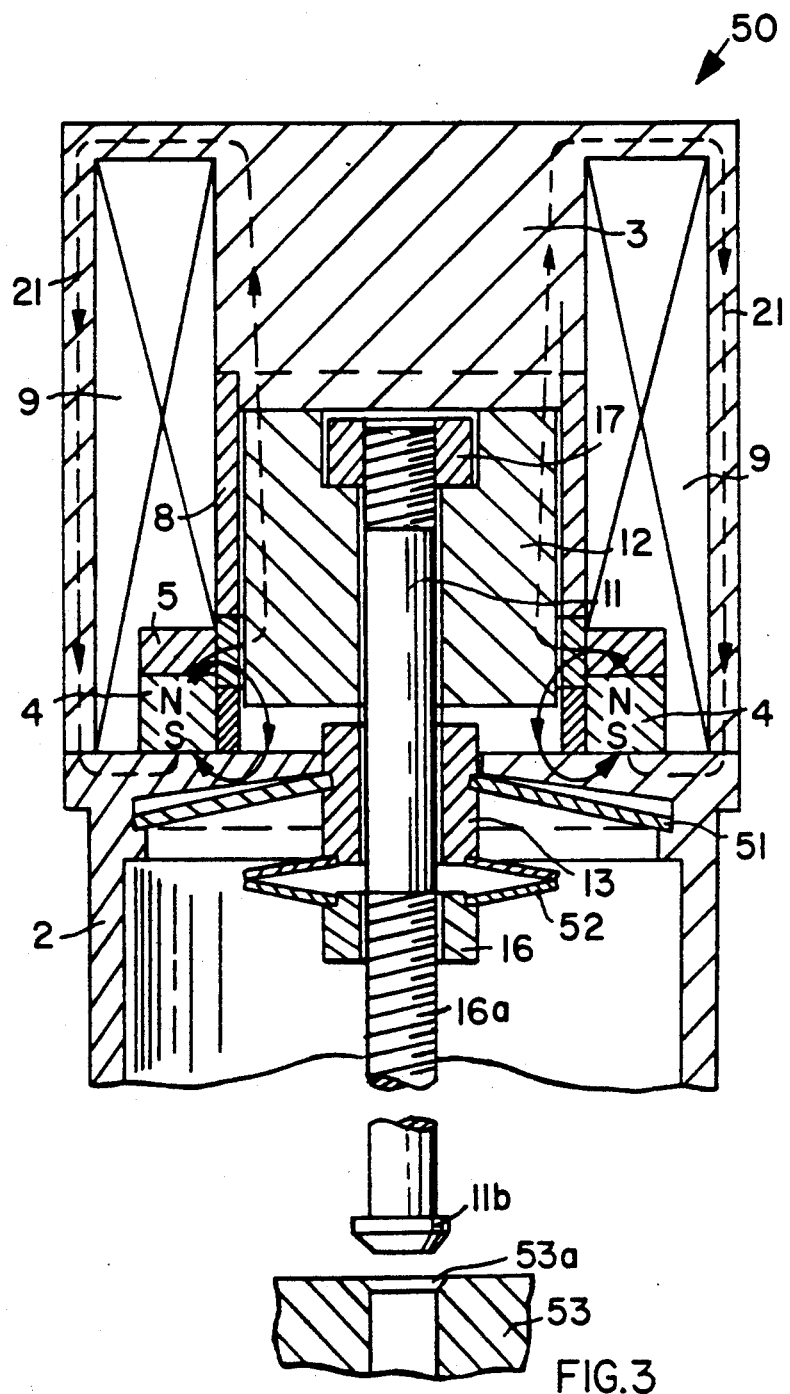
FIG. 3 is a sectional view similar to that of FIG. 1, but showing another embodiment with a Belleville spring combined with a wedge spring, whereby the valve is shown in the valve open position.
Figure 4:
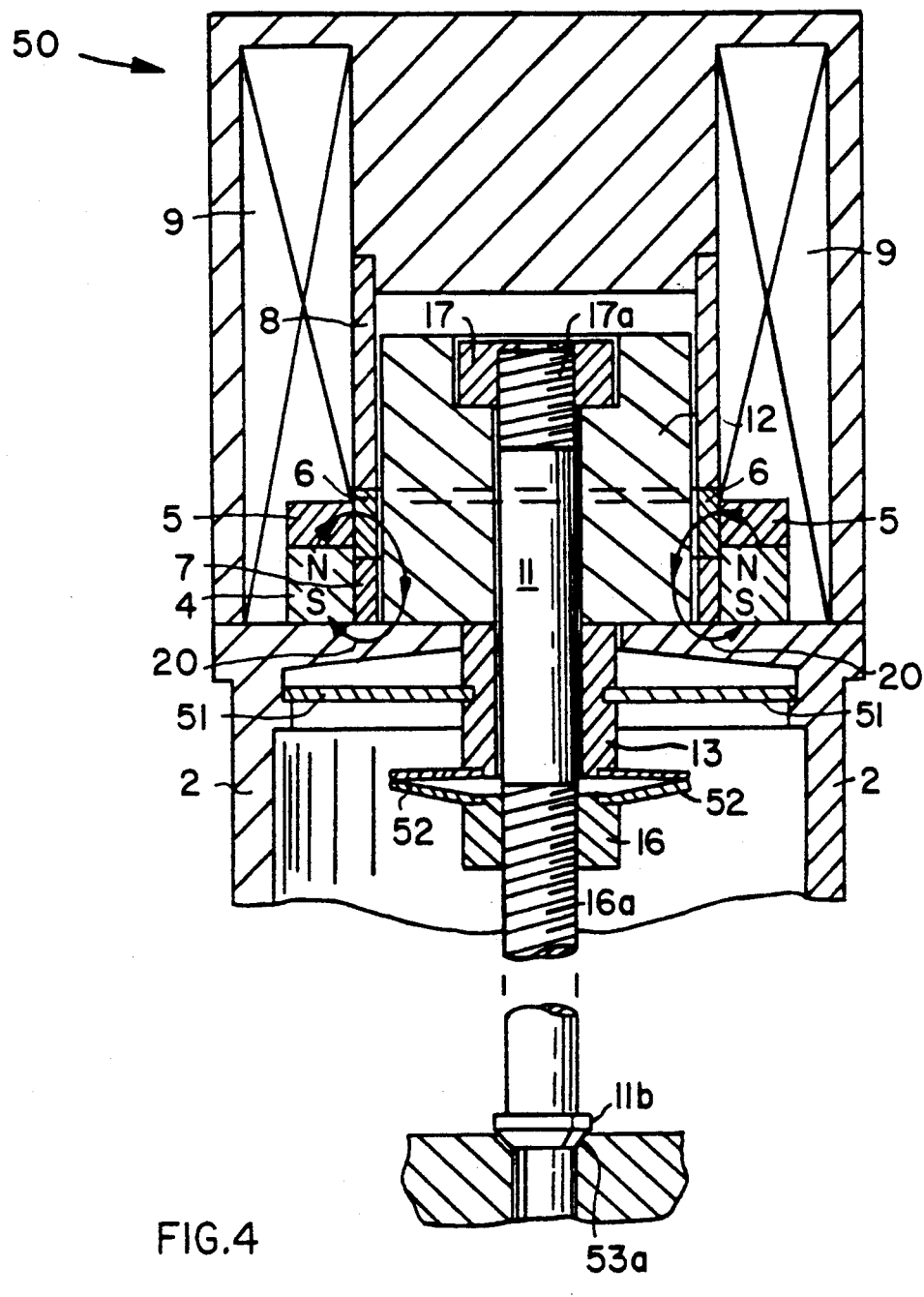
FIG. 4 shows the valve of FIG. 3 in the valve closed position.

FIG. 3 shows the open state of a further embodiment of a magnetic valve 50 according to the invention while FIG. 4 shows the closed state of the second valve embodiment. The valve 50 is substantially the same as that shown in FIGS. 1 and 2, except that the spring arrangement is slightly different in FIGS. 3 and 4. A Belleville spring 51 is not biased when the valve 50 is closed. A conical or volute spring 52 alone stores the permanent magnetic force 20 of the permanent magnet 4 through the guide sleeve 13.

The poppet 11b in FIG. 3 has a conical surface cooperating with a respective conical valve seat 53a in a conduit 53.

Figure 6:
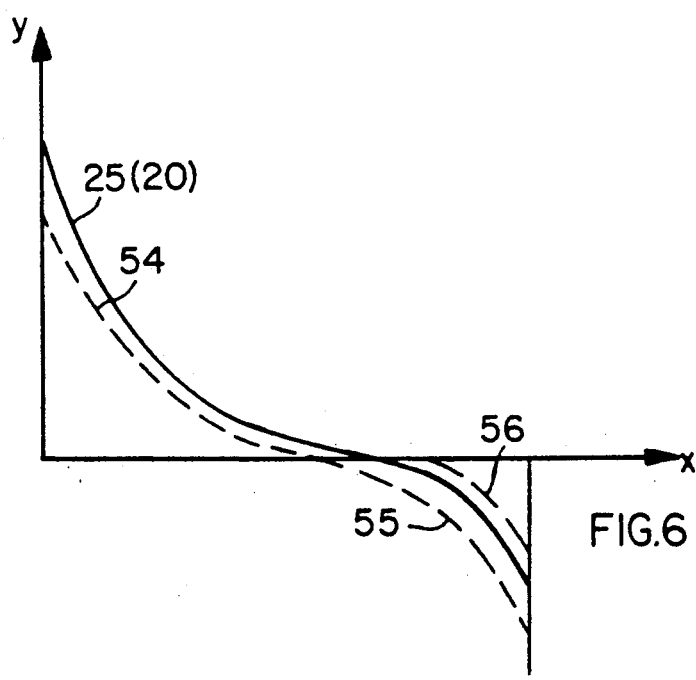
FIG. 6 is a diagram similar to that of FIG. 5, but showing the forces effective in the valve of FIGS. 3 and 4 as a function of the work stroke of the valve.

In FIG. 6 the curve 25 represents the permanent magnetic force 20 of the permanent magnet 4. The dashed line 54 represents the force of the spring 52 which, upon passing through zero, has expended its force completely on the valve stem 11. The dashed curve 55 represents the spring force of the spring 51 which becomes effective after passing through zero providing the valve of FIG. 3 with a monostable characteristic. The curve 56 corresponds to the spring force of the spring 51 for imparting a bistable characteristic to the valve. The adjustment is again possible with the ring 16 engaging the threading 16a on the valve stem 11 to provide one or the other spring characteristics.

Although the invention has been described with reference to specific example embodiments, it will be appreciated, that it is intended to cover all modifications and equivalents within the scope of the appended claims.

What I claim is:

1. A valve for sealing a pressurized conduit, comprising:
   (a) a valve housing including a housing cover, a permanent magnet having a permanent magnetic force in said valve housing, an electromagnet generating an electromagnetic force for operating said valve, said electromagnet including a solenoid coil and an armature in said housing, said permanent magnetic force normally pressing said armature against said housing when said valve is closed, and spring means arranged for cooperation with said solenoid coil when said solenoid coil is energized,
   (b) said permanent magnet being arranged in a recess in a lower portion of said solenoid coil facing said armature, a housing extension reaching radially inwardly, said solenoid coil and said permanent magnet each having a downwardly facing side having direct contact with said housing extension, a magnetizable soft iron ring arranged between said solenoid coil and said permanent magnet, so that, when said valve is closed, a magnetic circuit of said permanent magnet establishes itself between a north pole and a south pole of said permanent magnet through said soft iron ring and through said housing extension substantially without an air gap,
   (c) sleeve means for closing and opening said valve operable by said permanent magnet through said armature, said spring means comprising a first spring having a first spring force and a second spring having a second spring force, said first and second springs being arranged for cooperation with said sleeve means, so that when said valve is closed said permanent magnetic force of said permanent magnet urges said first and second springs in a valve closing direction, whereby a larger proportion of said permanent magnetic force is effective on said first spring than on said second spring,
   (d) wherein during opening of said valve said electromagnetic force initially overcomes said second spring force through a gap (29) formed between said armature and an adjustment ring, whereupon said electromagnetic force reduces the effect of said permanent magnetic force down to zero, whereby energy stored in said first spring becomes free for fully opening said valve, and wherein
   (e) an air gap (G) is formed between a downwardly facing surface of said armature and said housing extension when said valve is fully opened, so that said permanent magnetic force which is effective on said armature through an outer magnetic circuit in a valve opening direction, is also effective for biasing said first spring to store energy in said first spring when said valve is fully opened.

2. The valve of claim 1, wherein said first spring is a cup spring.

3. The valve of claim said second spring has a short spring stroke and can be cocked in but one direction.

4. The valve of claim 3, wherein said second spring is a helical spring.

5. The valve of claim 1, further comprising a valve stem and a valve seat cooperating with said valve stem, said valve stem having an upper threaded end on which said adjustment ring is received, said armature having a longitudinal axial through-bore and a recess surrounding said through-bore at an upper end of said armature, said valve stem passing slideably through said through-bore and through said sleeve means, a further adjustment ring received on a lower threaded portion of said valve stem, wherein said first spring is effective between said valve housing and said sleeve means, and wherein said second spring is effective between said sleeve and said further adjustment ring.

* * * * *

UNITED STATES PATENT AND TRADEMARK OFFICE
CERTIFICATE OF CORRECTION

PATENT NO. : 5,029,807
DATED : July 9, 1991
INVENTOR(S) : Franz Fuchs

It is certified that error appears in the above-identified patent and that said Letters Patent is hereby corrected as shown below:

```
In Abstract [57] line 6 , replace  "THe" by --The--;
In Claim 3, line 1, after "claim" insert --1, wherein--.
 (column 8, line 44)
```

Signed and Sealed this

Thirteenth Day of October, 1992

Attest:

DOUGLAS B. COMER

*Attesting Officer*    *Acting Commissioner of Patents and Trademarks*